(12) United States Patent
Williamson

(10) Patent No.: US 8,198,355 B2
(45) Date of Patent: Jun. 12, 2012

(54) NANOCOMPOSITE COMPOSITIONS OF POLYAMIDES AND SEPIOLITE-TYPE CLAYS

(75) Inventor: David T. Williamson, Chesterfield, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 12 days.

(21) Appl. No.: 11/811,034

(22) Filed: Jun. 8, 2007

(65) Prior Publication Data

US 2010/0324195 A1 Dec. 23, 2010

Related U.S. Application Data

(60) Provisional application No. 60/813,943, filed on Jun. 15, 2006.

(51) Int. Cl.
*C08K 3/34* (2006.01)
*C08L 77/00* (2006.01)
(52) U.S. Cl. .................. 524/456; 524/445; 524/606
(58) Field of Classification Search .................. 524/445, 524/456, 606
See application file for complete search history.

(56) References Cited

U.S. PATENT DOCUMENTS

| | | | |
|---|---|---|---|
| 5,164,440 A * | 11/1992 | Deguchi et al. | 524/444 |
| 5,955,517 A | 9/1999 | Hilti et al. | |
| 6,673,860 B1 | 1/2004 | Grutke et al. | |
| 2004/0087706 A1 | 5/2004 | Fish, Jr. et al. | |
| 2009/0142585 A1 * | 6/2009 | Kobayashi et al. | 428/328 |

FOREIGN PATENT DOCUMENTS

| | | |
|---|---|---|
| EP | 276 828 | 3/1988 |
| EP | 1598313 | 11/2005 |
| GB | 1114174 | 5/1968 |
| JP | 02182758 A * | 7/1990 |
| WO | WO98/08901 | 3/1998 |
| WO | WO 9941299 A1 * | 8/1999 |
| WO | WO01/12678 | 2/2001 |
| WO | WO2007/143019 | 12/2007 |

* cited by examiner

*Primary Examiner* — Vickey Nerangis
(74) *Attorney, Agent, or Firm* — Kevin S. Dobson

(57) ABSTRACT

The invention is directed to nanocomposite compositions that contain at least one thermoplastic polyamide and unmodified sepiolite-type clay nanoparticles. It, also, includes articles containing such compositions.

14 Claims, 3 Drawing Sheets

NANOCOMPOSITE COMPOSITIONS OF POLYAMIDES AND SEPIOLITE-TYPE CLAYS

CROSS REFERENCE TO RELATED APPLICATIONS

This application claims the benefit of U.S. Provisional Application No. 60/813,943, filed Jun. 15, 2006, which is incorporated in its entirety as a part hereof for all purposes.

FIELD OF THE INVENTION

This invention is directed to nanocomposites comprising thermoplastic polyamides and unmodified sepiolite-type clay nanoparticles. The invention, also, includes articles made the nanocomposites.

TECHNICAL BACKGROUND OF THE INVENTION

Nanocomposites are compositions that satisfy many of the challenges currently presented by automotive plastics and composites needs. These materials offer a variety of desirable properties including: low coefficient of thermal expansion, high heat distortion temperatures, lightweight, improved scratch resistance, and good surface appearance. Nanocomposite compositions are polymers reinforced with nanometer sized particles ("nanoparticles"), i.e., typically particles with a dimension on the order of 1 to several hundred nanometers. These materials can be used in structural, semi-structural, high heat underhood, and Class A automotive components, among others. In other words, these nanocomposites are compositions in which small particles are dispersed in the plastic matrix.

Injection moldable thermoplastics have long been mechanically reinforced with an addition of particulate and fiber fillers in order to improve mechanical properties such as stiffness, dimensional stability, and temperature resistance. Typical fillers include chopped glass fiber and talc, which are added at filler loadings of 20-40% in order to obtain significant mechanical reinforcement. At these loading levels, however, low temperature impact performance and material toughness are usually sacrificed. Polymer-silicate nanocomposite materials, in other words, compositions in which the silicate is dispersed as very small particles, can address these issues.

Polymer-layered silicate nanocomposites normally incorporate a layered to clay mineral filler in a polymer matrix. Layered silicates are made up of several hundred thin platelet layers stacked into an orderly packet known as a tactoid. Each of these platelets is characterized by large aspect ratio (diameter/thickness on the order of 100-1000). Accordingly, when the clay is dispersed homogeneously and exfoliated as individual platelets throughout the polymer matrix, dramatic increases in strength, flexural and Young's modulus, and heat distortion temperature are observed at very low filler loadings (<10% by weight) because of the large surface area contact between polymer and filler.

Clay minerals and their industrial applications are reviewed by H. M. Murray in Applied Clay Science 17(2000) 207-221. Two types of clay minerals are commonly used in nanocomposites: kaolin and smectite. The molecules of kaolin are arranged in two sheets or plates, one of silica and one of alumina. The most widely used smectites are sodium montmorillonite and calcium montmorillonite. Smectites are arranged in two silica sheets and one alumina sheet. The molecules of the montmorillonite clay minerals are less firmly linked together than those of the kaolin group and are thus further apart.

Polyamide nanocomposites typically combine a polyamide with an inorganic layered silicate, usually a smectite clay The alkali and alkaline earth ions in the layered silicate are exchanged with onium ions, typically alkyl ammonium ions from alkylammonium salts (for example octadecylammonium chloride or a quaternary ammonium tallow), or ω-amino acids (for example, 12-aminolauric acid) in order to facilitate intercalation and subsequent exfoliation. Clays that have been so treated are often referred to as "(organically) modified clays" or "organoclays."However, these compounds are not thermally stable enough to be used with those polyamides that are compounded high temperatures, particularly semiaromatic polyamides.

Polyamide nanocomposites have been prepared via melt compounding (also referred to as "melt mixing"). In Japanese Patent Application H02[1990]-182758, Oda et al. melt compounded 15 and 30 wt % of sepiolite into polyamide 6 after drying the sepiolite for 24 h at 100° C. It describes the fiber diameter of the sepiolite as ordinarily about 0.05 to 0.3 μm, and the fiber length, about 1 to 100 μm. No particular restriction on the fiber diameter or the fiber length of the sepiolite is disclosed, but it is disclosed that sepiolite with a fiber diameter of about 0.1 to 0.2 μm and a fiber length of about 3 to 30 μm is easy to acquire and offers excellent results. It is also disclosed that the use of less than 5 wt % sepiolite does not achieve improvement in the properties of mechanical strength, heat resistance, and warpage.

For the reasons set forth above, there exists a need for improved polyamide nanocomposites with low concentrations of nanoparticles that can be processed at high temperatures and yield improved properties. The present invention fulfills such need.

SUMMARY OF THE INVENTION

The invention is directed to a nanocomposite composition, comprising at least one thermoplastic polyamide and unmodified sepiolite-type clay particles wherein the width and thickness of a particle are each less than 50 nm.

DETAILED DESCRIPTION OF THE INVENTION

This invention concerns nanocomposite compositions that contain at least one thermoplastic polyamide and unmodified sepiolite-type clay nanoparticles. The invention includes articles containing such compositions. As used herein, the term "nanocomposite" or "polymer nanocomposite" or "nanocomposite composition" means a polymeric material which contains nanoparticles dispersed throughout the polymeric material wherein the nanoparticles have at least one dimension less than 50 nm ("nanoparticles"). The term "polyamide composite" refers to a nanocomposite in which the polymeric material includes at least one polyamide.

Where a range of numerical values is recited herein, unless otherwise stated, the range is intended to include the endpoints thereof, and all integers and fractions within the range. It is not intended that the scope of the invention be limited to the specific values recited when defining a range.

Sepiolite-Type Clay

As used herein, the term "sepiolite-type clay" refers to both sepiolite and attapulgite (palygorskite) clays and mixtures thereof.

Sepiolite-type clays are layered fibrous materials in which each layer is made up of two sheets of tetrahedral silica units bonded to a central sheet of octahedral units containing magnesium ions (see, e.g., Polymer International, 53, 1060-1065 (2004)).

Sepiolite ($Mg_4Si_6O_{15}(OH)_2.6(H_2O)$) is a hydrated magnesium silicate filler that exhibits a high aspect ratio due to its fibrous structure. Unique among the silicates, sepiolite is composed of long lath-like crystallites in which the silica chains run parallel to the axis of the fiber. The material has been to shown to consist of two forms, an $\alpha$ and a $\beta$ form. The $\alpha$ form is known to be long bundles of fibers and the $\beta$ form is present as amorphous aggregates.

Attapulgite (also known as palygorskite) is almost structurally and chemically identical to sepiolite except that attapulgite has a slightly smaller unit cell. As used herein, the term "sepiolite-type clay" includes attapulgite as well as sepiolite itself.

Sepiolite-type clays are available in a high purity, unmodified form (e.g., Pangel® S-9 sepiolite clay from the Tolsa Group, Madrid, Spain). Preferably the clay is in the form of a fine particulate, so it may be readily dispersed in the polyamide melt.

The sepiolite-type clays used in the compositions described herein are unmodified. The term "unmodified" means that the surface of the sepiolite-type clay has not been treated with an organic compound such as an onium compound (for example, to make its surface less polar).

Figure 1:
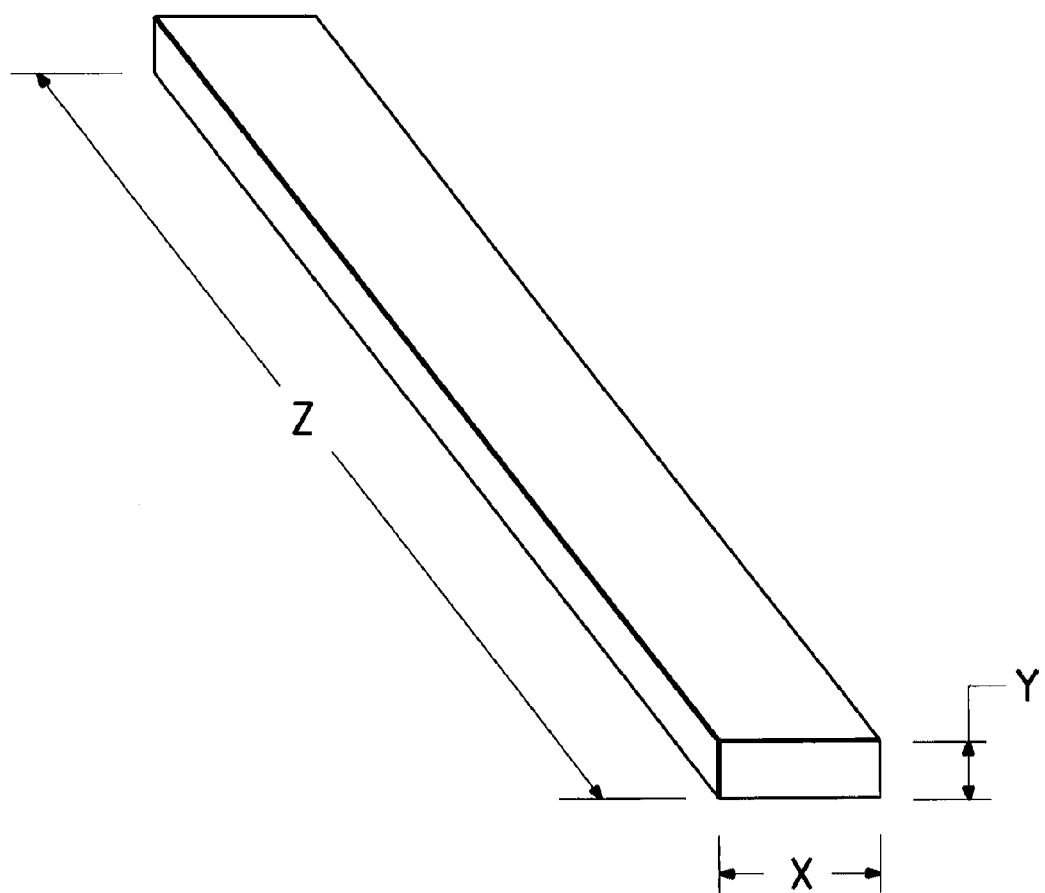
FIG. 1 is a schematic diagram of the dimensions of a sepiolite-type clay fiber.

The width (x) and thickness (y) of the sepiolite-type clay fiber contained in the compositions described herein are each less than 50 nm (FIG. 1). The length (z) of a sepiolite-type fiber is also illustrated in FIG. 1. In an embodiment, the sepiolite-type clay is rheological grade, such as described in European patent applications EP-A-0454222 and EP-A-0170299 and marketed under the trademark Pangel® by Tolsa, S.A., Madrid, Spain. As described therein "rheological grade" denotes a sepiolite-type clay with a specific surface area greater than 120 $m^2/g$ ($N_2$, BET), and typical fiber dimensions: 200 to 2000 nm long, 10-30 nm wide, and 5-10 nm thick.

Rheological grade sepiolite is obtained from natural sepiolite by means of special micronization processes that substantially prevent breakage of the sepiolite fibers, such that the sepiolite disperses easily in water and other to polar liquids, and has an external surface with a high degree of irregularity, a high specific surface, greater than 300 $m^2/g$ and a high density of active centers for adsorption, that provide it a very high water retaining capacity upon being capable of forming, with relative ease, hydrogen bridges with the active centers. The microfibrous nature of the rheological grade sepiolite nanoparticles makes sepiolite a material with high porosity and low apparent density.

Additionally, rheological grade sepiolite has a very low cationic exchange capacity (10-20 meq/100 g) and the interaction with electrolytes is very weak, which in turn causes rheological grade sepiolite not to be practically affected by the presence of salts in the medium in which it is found, and therefore, it remains stable in a broad pH range.

The above-mentioned qualities of rheological grade sepiolite can also be attributed to rheological grade attapulgite with particle sizes smaller than 40 microns, such as for example the range of ATTAGEL goods (for example ATTAGEL 40 and ATTAGEL 50) manufactured and marketed by the firm Engelhard Corporation, United States, and the MIN-U-GEL range of Floridin Company.

Preferably, the amount of sepiolite-type clay used in the present invention ranges from about 0.1 to about 30 wt %, most preferably from about 0.1 to about 4 wt % based on the total amount of sepiolite-type clay and polyamide in the final composition. The specific amount chosen will depend on the intended use of the nanocomposite composition, as is well understood in the art. For example, in film, it may be advantageous to use as little sepiolite-type clay as possible, so as to retain desired optical properties. "Masterbatches" of the nanocomposite composition containing relatively high concentrations of sepiolite-type clay may also be used. For example, a nanocomposite composition masterbatch containing 30% by weight of the sepiolite-type clay may be used. If a composition having 3 weight percent of the sepiolite-type clay is needed, the composition containing the 3 weight percent may be made by melt mixing 1 part by weight of the 30% masterbatch with 9 parts by weight of the "pure"polyamide. During this melt mixing, other desired components can also be added to form a final desired composition.

Polyamides

As used herein, "polyamide" means a condensation polymer in which more than 50 percent of the groups connecting repeat units are amide groups. Thus "polyamide" may include polyamides, poly(ester-amides) and poly(amide-imides), so long at more than half of the connecting groups are amide groups. In one embodiment at least 70% of the connecting groups are amides, in another embodiment at least 90% of the connecting groups are amides, and in another embodiment all of the connecting groups are amides. The proportion of ester connecting groups can be estimated to a first approximation by the molar amounts of monomers used to make the polyamides.

Polyamides suitable for use in the nanocomposites described herein comprise thermoplastic polyamide homopolymers, copolymers, terpolymers, or higher polymers (both block and random). As used herein, the term "thermoplastic polyamide" denotes a polyamide which softens and can be made to flow when heated and hardens on cooling, retaining the shape imposed at elevated temperature. Preferably, such polyamides are aliphatic or semiaromatic.

Aliphatic Polyamides

Aliphatic polyamides are well known in the art. Suitable polyamides include, for example, those described in U.S. Pat. Nos. 2,071,250; 2,071,251; 2,130,523; 2,130,948; 2,241,322; 2,241,322; 2,312,966; 2,512,606; and 3,393,210. Methods of production are well known in the art. For example, the polyamide resin(s) can be produced by condensation of equimolar amounts of saturated dicarboxylic acid containing from 4 to 12 carbon atoms with a diamine, in which the diamine contains from 4 to 14 carbon atoms. Excess diamine can be employed to provide an excess of amine end groups in the polyamide. Examples of aliphatic polyamides so produced include but are not limited to poly(tetramethylene adipamide) (polyamide 4,6), poly(hexamethylene adipamide) (polyamide 6,6), poly(hexamethylene azelaamide) (polyamide 6,9), poly(hexamethylene sebacamide) (polyamide 6,10), poly (hexamethylene dodecanoamide) (polyamide 6,12), bis (para-aminocyclohexyl)methane dodecanoamide, and the like. Aliphatic polyamides can also be produced by ring opening polymerization of lactams, such as ε-caprolactam (polycaprolactam, also known as polyamide 6) and poly-11-amino-undecanoic acid (polyamide 11). It is also possible to use polyamides prepared by the copolymerization of two of the above polymers or terpolymerization of the above polymers or their components. Examples of copolycondensation polyamides include polyamide 6/66, polyamide 6/610, polyamide 6/12, polyamide 6/46, and the like. Among the aliphatic polyamides, polyamide 6 and 6,6 are preferred.

Semiaromatic Polyamides

Thermoplastic semiaromatic polyamides are particularly preferred for the nanocomposites described herein. As used herein, "semiaromatic polyamide" means a polyamide containing both divalent aromatic groups and divalent non-aromatic groups. As used herein, "a divalent aromatic group" means an aromatic group with links to other parts of the macrocyclic molecule. For example, a divalent aromatic group may include a meta- or para-linked monocyclic aromatic group. Preferably the free valencies are to aromatic ring carbon atoms.

Semiaromatic polyamides are well known in the art. Suitable polyamides and methods of production include, for example, those described in U.S. Pat. Nos. 5,378,800; 5,322,923; 5,424,104; Re. 34,447; and 6,140,459.

The thermoplastic semiaromatic polyamide may be one or more homopolymers, copolymers, terpolymers, or higher polymers that are derived in part from monomers that contain divalent aromatic groups. It may also be a blend of one or more aliphatic polyamides with one or more homopolymers, copolymers, terpolymers, or higher polymers that are derived in part from monomers containing divalent aromatic groups.

Preferred monomers containing divalent aromatic groups are terephthalic acid and its derivatives, isophthalic acid and its derivatives, and m-xylylenediamine. It is preferred that about 5 to about 75 mole percent of the monomers used to make the semiaromatic polyamide used in the nanocomposites described herein contain divalent aromatic groups, and more preferred that about 10 to about 55 mole percent of the monomers contain divalent aromatic groups. Thus, preferably, about 5 to about 75 mole percent, or more preferably, 10 to about 55 mole percent of the repeat units of all polyamides used in the nanocomposites described herein contain divalent aromatic groups.

The semiaromatic polyamide may optionally contain repeat units derived from one or more additional aliphatic dicarboxylic acid monomers or their derivatives, such as adipic acid, sebacic acid, azelaic acid, dodecanedioic acid, and other aliphatic or alicyclic dicarboxylic acid monomers having 6 to 20 carbon atoms. As used herein, "alicyclic" means a divalent non-aromatic hydrocarbon group containing a cyclic structure therein.

The semiaromatic polyamide may optionally contain repeat units derived from one or more aliphatic or alicyclic diamine monomers having 4 to 20 carbon atoms. Preferred aliphatic diamines may be linear or branched and include hexamethylenediamine; 2-methyl-1,5-pentanediamine; 1,8-diaminooctane; 1,9-diaminononane; methyl-1,8-diaminooctane; 1,10-diaminodecane; and 1,12-diaminododecane. Examples of alicyclic diamines include 1-amino-3-aminomethyl-3,5,5,-trimethylcyclohexane; 1,4-bis(aminomethyl)cyclohexane; and bis(p-aminocyclohexyl)methane.

The semiaromatic polyamide may optionally contain repeat units derived from lactams and aminocarboxylic acids (or acid derivatives), such as caprolactam, 11-aminoundecanoic acid, and laurolactam.

Examples of preferred semiaromatic polyamides include poly(m-xylylene adipamide) (polyamide MXD,6); hexamethylene adipamide/hexamethylene terephthalamide copolyamide (polyamide 6,T/6,6); hexamethylene terephthalamide/2-methylpentamethylene terephthalamide copolyamide (polyamide 6,T/D,T); poly(dodecamethylene terephthalamide) (polyamide 12,T); poly(decamethylene terephthalamide) (polyamide 10,T); decamethylene terephthalamide/decamethylene dodecanoamide copolyamide (polyamide 10,T/10,12); poly(nonamethylene terephthalamide) (polyamide 9,T); the polyamide of hexamethylene isophthalamide and hexamethylene adipamide (polyamide 6,I/6,6); the polyamide of hexamethylene terephthalamide, hexamethylene isophthalamide, and hexamethylene adipamide (polyamide 6,T/6,I/6,6); and copolymers and mixtures of these polymers.

The semiaromatic polyamide will preferably have a melting point that is at least about 280° C. and is preferably less than about 340° C.

Among the semiaromatic polyamides, hexamethylene adipamide/hexamethylene terephthalamide copolyamide (polyamide 6,T/6,6) and hexamethylene terephthalamide/2-methylpentamethylene terephthalamide copolyamide (polyamide 6,T/D,T) are preferred.

Solid Particulate Fillers (Exclusive of the Sepiolite-Type Clay)

As used herein, "a solid particulate filler exclusive of the sepiolite-type clay" means any solid (infusible at temperatures to which the composition is normally exposed) which is finely divided enough to be dispersed under melt mixing conditions (see below) into the composition.

Solid particulate fillers must be finely divided enough to be dispersed under melt mixing conditions (see below) into the composition. Typically, the solid particulate filler will be a material which may already be used in thermoplastic compositions, such as pigments, reinforcing agents, flame retardants, and fillers. The solid particulate filler may or may not have a is coating on it, for example, a sizing and/or a coating to improve adhesion of the solid particulate filler to the polymers of the composition. The solid particulate filler may be organic or inorganic.

Useful specific reinforcing agents include minerals such as kaolin clay, talc, wollastonite, mica, and calcium carbonate; glass in various forms such as fibers, milled glass, solid or hollow spheres; carbon as black or fiber; titanium dioxide; aramid in the form of short fibers, fibrils or fibrids; and mixtures of two or more of these. Other reinforcing agents are wollastonite, mica, talc, and glass especially glass fiber and mixtures of two or more of these. These reinforcing agents may be coated with adhesion promoters or other materials which are commonly used to coat reinforcing agents used in thermoplastics. The reinforcing agents may be present at 0 to about 60 wt % based on the total composition.

Typical flame retardants include brominated polystyrene, brominated polyphenylene oxide, red phosphorus, magnesium hydroxide, and magnesium carbonate. These are typically used with flame retardant synergists, such as antimony pentoxide, antimony trioxide, sodium antimonate or zinc borate.

The solid particulate material may be conventionally melt mixed with the nanocomposite, for example, in a twin screw extruder or Buss kneader. It may be added at the same time as the sepiolite-type clay, although if a lot of particulate material is added it may increase the viscosity, and care should be taken not to increase the viscosity too high.

The solid particulate material exclusive of the sepiolite-type clay may be present at 0 to about 60 weight percent of the total composition.

Polymeric Toughening Agents

Improvement of impact strength, or toughness, of polyamide resins has long been of interest. Resistance to shattering or brittle breaking on impact of polyamide molded articles is a desirable feature of any molded article. Any tendency to break on impact in a brittle fashion (rather than ductile fashion) is a significant limitation on the usefulness of such articles. Breaks in ductile materials are characterized more by tearing with a large volume of adjacent material yielding at the edge of the crack or tearing rather than a sharp, clean break with little molecular displacement. A resin having good ductility is one that is resistant to crack propagation caused by impact.

Thus, a preferred optional ingredient in the compositions of the present invention is a polymeric toughening agent. One type of polymeric toughening agent is a polymer, typically though not necessarily an elastomer, which has attached to it functional groups which can react with the polyamide (and optionally other polymers present) to produce a compounded multiphase resin with improved impact strength versus the untoughened polyamide. Some functional groups that can react with polyamides are carboxyl (—COOH), metal-neutralized carboxyl, amine, anhydride, epoxy, and bromine. Since polyamides usually have carboxyl (—COOH) and amine groups present, these functional groups usually can react with carboxyl and/or amine groups. Such functional groups are usually "attached" to the polymeric toughening agent by grafting small molecules onto an already existing polymer or by copolymerizing a monomer containing the desired functional group when the polymeric toughener molecules are made by copolymerization. As one example of grafting, maleic anhydride may be grafted onto a hydrocarbon rubber using free radical grafting techniques. The resulting grafted polymer has carboxylic anhydride and/or carboxyl groups attached to it.

A variety of additives have been added to polyamide resins to improve strength and ductility. For example, U.S. Pat. No. 4,174,358, issued Nov. 13, 1979 to Epstein, herein incorporated by reference, describes improving impact strength and ductility by adding a selected random copolymer which adheres to the polyamide. In U.S. Pat. No. 5,112,908, issued May 12, 1990, herein incorporated by reference, Epstein teaches that in certain polymeric toughening agents for polyamides, the sites that promote adhesion with polyamide ("graft sites") preferably will be present as metal-neutralized carboxyl, adjacent carboxyl (i.e., a carboxylic acid monomer unit adjacent to a metal-neutralized carboxyl monomer unit), anhydride, or epoxy functional groups, but other functional sites such as sulfonic acid or amine may be effective. These sites will be present in amounts that provide the requisite grafting.

A preferred polymeric toughening agent is a copolymer of ethylene, propylene and 1,4-hexadiene and, optionally, norbornadiene, said copolymer having grafted thereto an unsaturated monomer taken from the class consisting of fumaric acid, maleic acid, maleic anhydride, the monoalkyl ester of said acids in which the alkyl group of the ester has 1 to 3 carbon atoms. For example, one such polymer is TRX 301, available from the Dow Chemical Company (Midland, Mich., USA).

Another type of polymeric toughening agent is an ionomer that contains certain types of ionic groups. The term "ionomer" as used herein refers to a polymer with inorganic salt groups attached to the polymer chain (*Encyclopedia of Polymer Science and Technology*, 2nd ed., H. F. Mark and J. I. Kroschwitz eds., vol. 8, pp. 393-396). Ionomers that act as polyamide toughening agents contain ionic groups which do not necessarily react with the polyamide but toughen through the compatibility of those ionic groups with the polyamide, which is caused by the solubility of the ions (for example, lithium, zinc, magnesium, and manganese ions) to in the polyamide melt. A preferred polymeric toughening agent of this type is an ionomer of units derived from alpha-olefin having the formula $RCH=CH_2$ wherein R is H or alkyl having from 1 to 8 carbon atoms and from 0.2 to 25 mole percent of units derived from an alpha, beta-ethylenically unsaturated mono- or dicarboxylic acid, at least 10% of the acid groups of said units being neutralized by metal ions having a valence of from 1 to 3, inclusive. Preferably, the ionomer will be a copolymer of ethylene and acrylic or methacrylic acid at least 10% neutralized by metal ions such as $Li^+$, $Zn^{+2}$, $Mg^{+2}$, and/or $Mn^{+2}$. For example, one such polymer is DuPont™ Surlyn® (E. I. du Pont de Nemours & Co., Inc., Wilmington, Del., USA).

In addition to the polymeric toughening agents described above, two halogenated elastomers have been identified as effective toughening agents for polyamides, namely, a halogenated isobutylene-isoprene copolymer, and a brominated poly(isobutylene-co-4-methylstyrene). The latter is commercially available as Exxpro specialty elastomer from Exxon Mobil Chemical (Houston, Tex., USA). It is believe to adhere to the polyamide by reaction of its benzylic bromines with polyamide amine end groups or amide groups [Li, D.; Yee, A. F.; Powers, K. W.; Wang, H. C.; Yu, T. C., Polymer, 34, 4471-(1993)].

In an embodiment there is about 2 to about 30 weight percent of the polymeric toughener in the composition, in another embodiment 5 to about 25 weight percent, and in another embodiment about 8 to about 20 weight percent, of the total composition.

The polymeric toughening agent may comprise a mixture of 2 or more polymers, at least one of which must contain reactive functional groups or ionic groups as described above. The other(s) may or may not contain such functional groups or ionic groups. For instance, a preferred polymeric toughening agent for use in the compositions described herein comprises a mixture of an ethylene/propylene/hexadiene terpolymer grafted with maleic anhydride and a plastomeric polyethylene such as Engage® 8180, an ethylene/1-octene copolymer available from the Dow Chemical Company (Midland, Mich., USA).

Additives

Other ingredients, particularly those commonly used in thermoplastics, may optionally be added to the present composition in amounts commonly used in thermoplastics. Such materials include antioxidants, antistatic additives, heat stabilizers, lubricant, mold release, (paint) adhesion promoters, other types of polymers (to form polymer blends), etc. Preferably the total of all these ingredients is less than about 60 weight percent, more preferably less than about 40, and especially preferably less than about 25 weight percent of the composition.

Melt Mixing

The compositions described herein can be made by typical melt mixing techniques. For instance, the ingredients may be added to a single or twin screw extruder or a kneader and mixed in the normal manner. After the materials are mixed, they may be formed (cut) into pellets or other particles suitable for feeding to a melt forming machine. Melt forming can be carried out by the usual methods for thermoplastics, such as injection molding, thermoforming, or extrusion, or any combination of these methods. Some of the ingredients such as fillers, plasticizers, and lubricants (mold release) may be added at one or more downstream points in the extruder, so as to decrease attrition of solids such as fillers, and/or improve dispersion, and/or decrease the thermal history of relatively thermally unstable ingredients, and/or decrease losses by evaporation of volatile ingredients.

The sepiolite-type clay may be melt mixed directly with the other ingredients at its desired final concentration. Alternatively, a masterbatch containing a relatively high concentration of sepiolite-type clay (e.g., 20-30 wt % in the polyamide(s) of choice) may be prepared by melt-mixing, and then the masterbatch is in turn melt mixed with additional ingredients to achieve the final composition.

It is also noted that "melt mixing" or, more precisely, applying shear stress to a melt of a polyamide/sepiolite-type clay nanocomposite sometimes is results in better dispersion of the nanoparticles in the already formed nanocomposite. Thus, post-treatment of the initially formed nanocomposite by shearing of the melt is a preferred process. This can be a process simply dedicated to improving the dispersion or, more preferably, occur when the polyamide composite is liquefied and subject to shear for another reason, such as mixing in other materials and or melt forming the nanocomposite composition. Useful types of apparatuses for this purpose include single and twin screw extruders and kneaders.

It has also been found that the mixing intensity [for example, as measured by extruder speed (revolutions per minute, rpm)] may affect the properties of the composition, especially toughness. While relatively higher rpm are preferred, the toughness may decrease at too high a mixer rotor speed. The optimum mixing intensity depends on the configuration of the mixer, the temperatures, compositions, etc. being mixed, and is readily determined by simple experimentation.

It is to be understood that any preferred ingredient and/or ingredient amount may be combined with any other preferred ingredient and/or ingredient amount herein.

Parts comprising the present composition may be made by heating the composition above the melting point (or glass transition temperature if the polyamide is amorphous) of the polyamide (and hence liquefying the polyamide), and then cooling them below the melting point to solidify the composition and formed a shaped part. Preferably, the part is cooled at least 50° C. below the melting point, more preferably at least 100° C. below the melting point. Most commonly, ultimately the composition will be cooled to ambient temperature, most typically 15-45° C.

Articles comprising the nanocomposite compositions produced by the present invention may be prepared by any means known in the art, such as, but not limited to, methods of injection molding, melt spinning, extrusion, blow molding, thermoforming, or film blowing.

The nanocomposite compositions described herein enhance such properties as tensile strength and modulus, flexural strength and modulus, and heat distortion temperature properties without significantly deleteriously affecting other properties such as melt viscosity and impact strength, especially when the concentration of the clay in the nanocomposite composition is relatively low.

Figure 3:
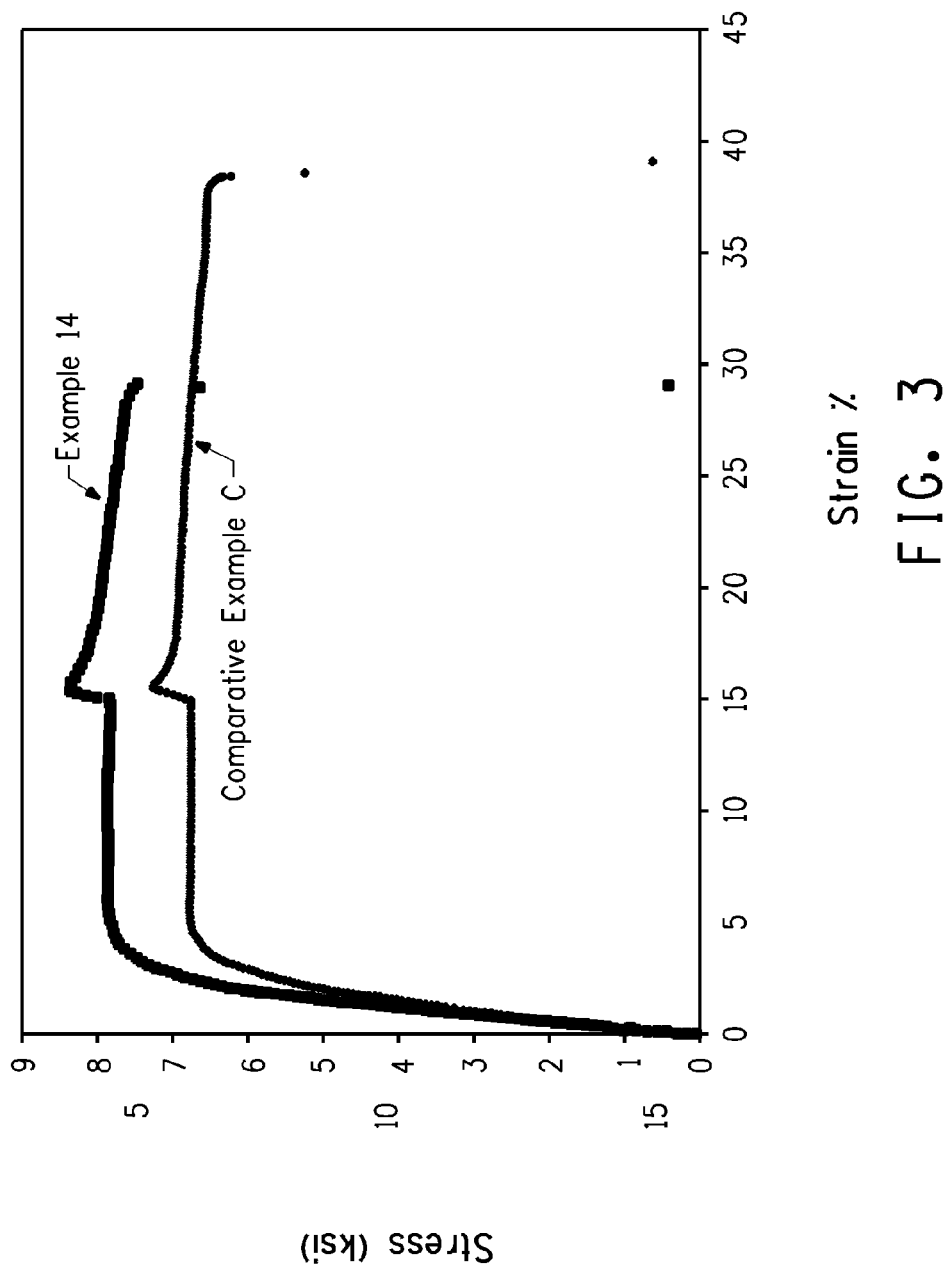
FIG. 3 depicts stress versus strain curves for toughened polyamide resins with (Example 14) and without (Comparative Example C) sepiolite (Pangel® S-9).

Surprisingly, toughened polyamide/sepiolite-type clay nanocomposites can demonstrate an increase as well in resilience (FIG. 3). As used herein, "resilience" means the capacity of a material to absorb energy when it is deformed elastically and then, upon unloading, to have this energy recovered. It is represented by the area under the curve in the elastic region in a stress-strain diagram. Formally, $$\text{Modulus of Resilience} = 0.5 * \text{modulus}^2 / \text{elastic strain}$$

Consequently, articles comprising such toughened nanocomposite compositions should exhibit increased shock resistance, i.e., superior damping of moderate shock or impact loads.

Applications

Application areas for the nanocomposites described therein include but are not limited to components in automotive, electrical/electronic, consumer goods, and industrial applications. The nanocomposites described herein that contain semiaromatic polyamide are especially useful for automotive parts that will be exposed to high temperatures, such as underhood automotives applications, and high-temperature electrical/electronic applications.

In the automotive area, the nanocomposites described herein can be used in applications such as, underhood applications (for example, radiator end tanks, connectors, air intake manifolds, air induction resonators, front end modules, engine cooling water outlets, fuel rails, ignition coils, engine covers), in the interior (for example, switches, handles, seat belt components, air bag containers, pedals, pedal boxes, seat systems), and in exterior applications (for example, wheel covers, sun roof surrounds, door handles, fuel filler flaps).

In the electrical/electronics area, the nanocomposites described herein can be used in applications such as connectors, coil formers, motor armature insulators, light housings, plugs, switches, switchgear, housings, relays, circuit breaker components, terminal strips, printed circuit boards, and housings for electronic equipment.

In the consumer goods area, the nanocomposites described herein can be used in applications such as power tool housings, sports equipment articles (for example, ski boots, ski bindings, ice skates, roller skates, tennis rackets), lighters, kitchen utensils, phone jacks, small appliances (for example, steam iron needles), large appliances (for example, oven fans and glass holders), furniture (for example, chair bases and arms), eyeglass frames, and packaging film.

In the industrial area, the nanocomposites described herein can be used in applications such as gears, pulley, bearings and bearing cages, valves, stadium seats, sliding rails for conveyers, castors, HVAC boiler manifold and diverting valves, and pump housings.

EXAMPLES

The present invention is further defined in the following Examples. It should be understood that these Examples, while indicating preferred embodiments of the invention, are given by way of illustration only The meaning of abbreviations is as follows: "cm" means centimeter(s), "min" means minute(s), "g" means gram(s), "mg" means milligram(s), "ksi" means kilograms per square inch, "wt %" means weight percent(age), "$T_g$" means glass transition temperature, "$T_{hc}$" means the temperature of crystallization on cooling from the melt, "$T_m$" means melting point, "M" means molar, "$M_n$" means number average molecular weight, "PDI" means polydispersity index and equals the weight average molecular weight divided by $M_n$, "MPa" means megapascal(s), "DSC" means differential scanning calorimetry, "TEM" means transmission electron microscopy, "HDT" means heat distortion temperature, and "rpm" means revolutions per minute.

Materials Glossary:

Aluminum stearate, a lubricant, was purchased from Chemtura Corporation (199 Benson Rd, Middlebury, Conn. 06749).

Attapulgite 420-P and 601-P are attapulgite minerals purchased from Zemex Industrial Minerals Company (Attapulgus, Ga. 39815, USA.)

Engage® polyolefin elastomers were provided by E. I. du Pont de Nemours & Co., Inc. (Wilmington, Del., USA) and are currently manufactured by the Dow Chemical Company (Midland, Mich., USA). Engage® 8180 is an ethylene/1-octene copolymer with 42 wt % comonomer.

HS 7.1.1 S, a heat stabilizer, was purchased from Shepherd Chemical Co. (Shepherd Norwood, 4900 Beech Street, Norwood, Ohio 45212) Irganox® 1010, an antioxidant, was purchased from Ciba Specialty Chemicals (Tarrytown, N.Y., USA).

Licowax® PED 521 is an oxidized polyethylene wax used as a mold lubricant available from Clariant Corp. (Charlotte, N.C. 28205, USA). It is reported to have an acid value of about 18 mg KOH/g wax.

M10 52 Talc was purchased from Minerals Technologies Inc. (New York, N.Y., USA).

Pangel® S-9, Pansil®, and Pangel® HV sepiolite were purchased from EM Sullivan Associates, Inc. (Paoli, Pa., USA), a distributor for the manufacturer, Tolsa S.A. (Madrid 28001, Spain). Pangel® HV is a rheological grade of sepiolite that has been micronized and has an unmodified surface. Pangel® S-9 is a rheological grade of sepiolite that has an unmodified surface and has been micronized in a similar fashion to Pangel® HV but has been processed with a second grinding process. Pansil® is a grade of sepiolite that has an unmodified surface and has been ground in a dry milling process.

Pelestat® 6500, a sodium-containing antistatic polyetheresteramide rubber, was purchased from Pelestat (1285 Avenues of Americas, New York, N.Y. 10019).

Sodium montmorillonite was purchased from Paikong (Taiwan).

TRX 301, an ethylene/propylene/hexadiene terpolymer grafted with 2.1% maleic anhydride, was purchased from Dow Chemical (Midland, Mich., USA).

Three polyamides were provided by E. I. du Pont de Nemours & Co., Inc. (Wilmington, Del., USA):

Polyamide A is a copolyamide of terephthalic acid, hexamethylenediamine, and 2-methyl-pentamethylenediamine where the two diamines are used in a 1:1 molar ratio.

Polyamide B is a copolyamide made from terephthalic acid, adipic acid, and hexamethylenediamine with a melting point of ca. 315° C.

Zytel® 101 is unreinforced polyamide 6,6.

Test Methods

Molecular weight determination. A size exclusion chromatography system comprised of a Model Alliance 2690™ from Waters Corporation (Milford, Mass.), with a Waters 410™ refractive index detector (DRI) and Viscotek Corporation (Houston, Tex.) Model T-60A™ dual detector module incorporating static right angle light scattering and differential capillary viscometer detectors was used for molecular weight characterization. The mobile phase was 1,1,1,3,3,3-hexafluoro-2-propanol (HFIP) with 0.01 M sodium trifluoroacetate. The dn/dc was measured for the polymers and it was assumed that all of the sample was completely eluted during the measurement.

Tensile modulus, strength and elongation were measured using ASTM Method D256 at an extension rate of 5.08 cm (2") per minute. This method was also used to obtain stress-strain curves in FIG. 3.

Flexural modulus (three point) was measured using ASTM Method D790.

Heat Distortion Temperature (also known as "heat deflection temperature," "deflection temperature under load," or DTUL) was measured using ASTM method E2092-03.

Notched and unnotched Izod pendulum impact strength was measured according to ASTM D256-06.

Transition temperatures. The melting point $T_m$ was determined according to ASTM D3418-82, at a heating rate of 10° C./min. The peak of the melting endotherm was taken as the melting point. The crystallization temperature $T_{hc}$ was taken as the peak of the crystallization exotherm upon cooling from the melt. The glass transition temperature $T_g$ was taken as the inflection point in the heat capacity during the second heating cycle.

Compounding and Molding Methods

All polyamide resins were dried at 90° C. for 12 h prior to extrusion and prior to molding. The mineral additives were used as received unless otherwise noted.

Compounding Method A Polymeric compositions were prepared by compounding in a 30 mm Werner and Pfleiderer twin screw extruder. All ingredients were mixed together and added through the rear feed throat (barrel 1) of the extruder, except that Pangel® S-9 and other minerals were side-fed into barrel 5 (of 10 barrels) and plasticizer was added using a liquid injection pump. Any exceptions to this method are noted in the examples. Barrel temperatures were set at 340° C., resulting in melt temperatures 290-350° C. depending on the composition and extruder rate and the screw rpm.

Compounding Method B Polymeric compositions were prepared by compounding in a 30 mm Buss CoKneader. The base resins (Polyamide A or Polyamide B) were added through the rear feed throat (barrel 1) of the extruder and the Pangel® S-9 sepiolite was added to a second feed port. Any exceptions to this method are noted in the examples. Barrel temperatures were set at 340° C., resulting in melt temperatures 290-350° C. depending on the composition and extruder rate and the screw rpm.

Compounding Method C Polymeric compositions were prepared by compounding in a 30 mm Werner and Pfleiderer twin screw extruder. All ingredients were mixed together and added through the rear feed throat (barrel 1) of the extruder, except that Pangel® S-9 sepiolite and other to minerals were side-fed into barrel 5 (of 10 barrels). Any exceptions to this method are noted in the examples. Barrel temperatures were set at 290° C., resulting in melt temperatures 290-300° C. depending on the composition and extruder rate and screw rpm.

Molding Methods. Resins were molded into ASTM test specimens on an Arburg 1.5 oz (43 g) or a Nissei 6 oz (170 g) injection molding machine. The melt temperature for Zytel®101 (polyamide 6,6) was 290° C., and mold temperatures were 70-80° C. The melt temperature for Polyamide A and Polyamide B was 310° C., and mold temperatures were 140° C. unless otherwise noted.

Example 1

Figure 2:
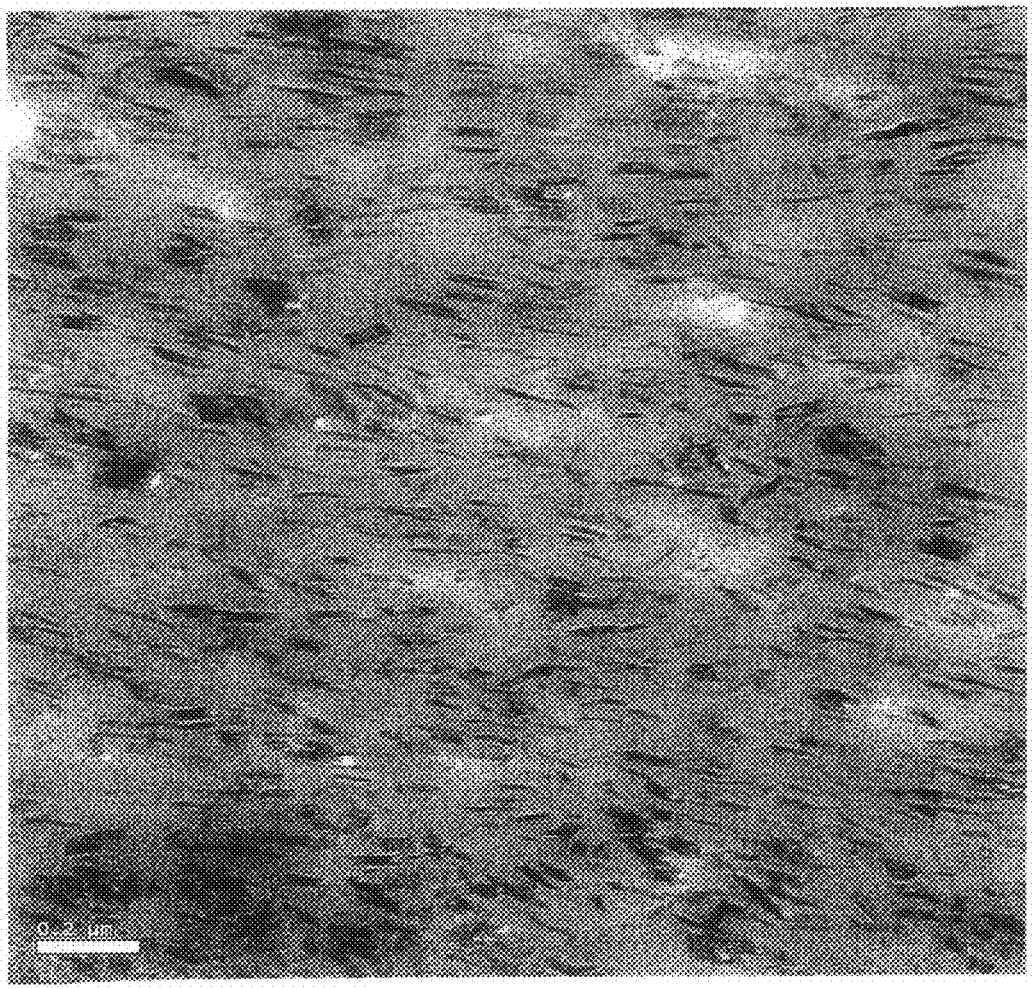
FIG. 2 is a transmission electron micrograph of a Polyamide A/sepiolite nanocomposite masterbatch prepared using a twin-screw extruder, containing 20 wt % sepiolite (Pangel® S-9).

Preparation of a Polyamide A/Sepiolite Nanocomposite Masterbatch Using a Twin-Screw Extruder A masterbatch of Polyamide A containing 20 wt % Pangel® S-9 sepiolite was prepared using Compounding Method A. SEC characterization indicated the polymer $M_n$ was 11370 and PDI=3.54. TEM analysis indicated the masterbatch formed a suitable nanocomposite. The sepiolite nanoparticles were well dispersed with some larger aggregates still present (FIG. 2). Test specimens were molded as described above, as well as test specimens of the Polyamide A base resin as a control; HDT and flexural modulus results are presented in Table 2.

Example 2

Preparation of a Polyamide B/Sepiolite Nanocomposite Masterbatch Using a Twin-Screw Extruder A masterbatch sample of Polyamide B with 20 wt % Pangel® S-9 sepiolite was prepared using Compounding Method A. SEC characterization indicated the polymer $M_n$ after extrusion was 20990 and PDI=2.04. Test specimens were molded as described above; HDT and flexural modulus results are presented in Table 2.

Example 3

Preparation of a Polyamide A/Sepiolite Nanocomposite Masterbatch Using a Buss CoKneader A masterbatch sample of Polyamide A with 14.3 wt % Pangel® S-9 sepiolite was prepared using Compounding Method B. SEC characterization indicated the polymer $M_n$ was 11370 and PDI=3.54. TEM analysis indicated the masterbatch formed a suitable nanocomposite with the particles well dispersed and some larger aggregates still present.

Example 4

Preparation of a Polyamide A/3 wt % Sepiolite Nanocomposite

A sample of the masterbatch prepared in Example 1 (20 wt % S-9 sepiolite in Polyamide A) was extruded with additional Polyamide A (15 wt % masterbatch, 85 wt % Polyamide A), using Compounding Method A, to prepare a nanocomposite containing 3 wt % sepiolite. Thermal analysis results are presented in Table 1. The resulting nanocomposite crystallized at a higher temperature on cooling from the melt (277° C.) than the Polyamide A control (255° C.), indicating that the sepiolite was an effective nucleating agent for Polyamide A. Test specimens were molded as described above; HDT and flexural modulus results are presented in Table 2.

Example 5

Preparation of a Polyamide B/3 wt % Sepiolite Nanocomposite

A sample of the masterbatch prepared in Example 2 (20 wt % S-9 sepiolite in Polyamide B) was extruded with additional Polyamide B (15 wt % masterbatch, 85 wt % Polyamide B), using Compounding Method A, to prepare a nanocomposite containing 3 wt % sepiolite. Thermal analysis results are presented in Table 1. Test specimens were molded as described above; HDT and flexural modulus results are presented in Table 2.

Example 6

Preparation of a Polyamide B/1 wt % Sepiolite Nanocomposite

A sample of the masterbatch prepared in Example 2 (20 wt % S-9 sepiolite in Polyamide B) was extruded with additional Polyamide B (5 wt % Is masterbatch, 95 wt % Polyamide B), using Compounding Method A, to prepare a nanocomposite containing 3 wt % sepiolite. Thermal analysis results are presented in Table 1. Test specimens were molded as described above; HDT and flexural modulus results are presented in Table 2.

Example 7

Preparation of a Polyamide A/1 wt % Sepiolite Nanocomposite

A sample of the masterbatch prepared in Example 2 (20 wt % S-9 sepiolite in Polyamide A) was extruded with additional Polyamide B (5 wt % masterbatch, 95 wt % Polyamide A), using Compounding Method A, to prepare a nanocomposite containing 1 wt % sepiolite. Thermal analysis results are presented in Table 1. Test specimens were molded as described above; HDT and flexural modulus results are presented in Table 2.

TABLE 1

Thermal Analysis of Semiaromatic Polyamide/sepiolite Nanocomposites

| Sample | Poly-amide | Pangel ® S-9 Sepiolite content, wt % | $T_g$(° C.) | $T_{hc}$(° C.) | $T_m$(° C.) |
| --- | --- | --- | --- | --- | --- |
| Control | A | 0 | 137 | 255 | 302 |
| Example 7 | A | 1 | 139 | 277 | 305 |
| Example 4 | A | 3 | 139 | 279 | 305 |
| Control | B | 0 | 83 | 271 | 310 |
| Example 6 | B | 1 | 96 | 274 | 304 |
| Example 5 | B | 3 | 85 | 278 | 314 |

TABLE 2

Physical Properties of Semiaromatic Polyamide/Sepiolite Nanocomposites.

| Sample | Poly-amide | Pangel ® S-9 Sepiolite Content, wt % | HDT (1.8 MPa), ° C. | Flexural Modulus (MPa) |
| --- | --- | --- | --- | --- |
| Control | A | 0 | 147 | 3000 |
| Example 1 | A | 20 | 214 | 7320 |
| Example 2 | B | 20 | 233 | 7410 |
| Example 4 | A | 3 | 149 | 3730 |
| Example 5 | B | 3 | 180 | 3900 |
| Example 6 | B | 1 | 149 | 3370 |
| Example 7 | A | 1 | 160 | 3610 |

Example 8

Comparative Example A

Preparation and Properties of Toughened Semiaromatic Polyamide Nanocomposites Two toughened semiaromatic polyamide materials were prepared with compositions as presented in Table 3. They were prepared using Compounding Method A, except that the masterbatch prepared in Example 1 was added at the rear feed port in Example 8. Test specimens were molded as described above with the exception that the Pelestat®6500 was added to the compounded pellets prior to injection molding. The results, presented in Table 3, demonstrate the increased stiffness and strength of the nanocomposite relative to the control (Comparative Example A), with minimal impact on the unnotched Izod impact strength.

TABLE 3

Properties of Toughened Semiaromatic Polyamide Nanocomposites

|  | Comparative Example A | Example 8 |
|---|---|---|
| Polyamide A (wt %) | 35.48 | 17.65 |
| Polyamide B (wt %) | 36.01 | 36.19 |
| TRX 301 (wt %) | 8.83 | 8.83 |
| Engage ® 8180 (wt %) | 7.06 | 7.06 |
| M10 Talc (wt %) | 0.44 | 0.44 |
| Irganox ® 1010 (wt %) | 0.44 | 0.44 |
| Example 1 (20 wt % Pangel S-9) (wt %) | 0.00 | 17.65 |
| S-9 sepiolite content (wt %) | 0.00 | 3.53 |
| Licowax ® PED 521 (wt %) | 0.26 | 0.26 |
| Pelestat ® 6500 (wt %) | 11.47 | 11.47 |
| Properties Dry as Molded |  |  |
| Tensile Strength (MPa) | 57.9 | 61.4 |
| Elongation to Break (%) | 17.5 | 14.7 |
| Tensile Modulus (MPa) | 1937 | 2302 |
| Flexural Modulus (MPa) | 1820 | 2213 |
| Unnotched Izod (ft lb/in) (J/m) | 74.39 (3971) | 66.75 (3563) |

Examples 9-11

Comparative Example B

Preparation and Properties of Aliphatic Polyamide Nanocomposites

A nanocomposite masterbatch of Zytel® 101 polyamide 6,6 and 20 wt % S-9 sepiolite was prepared using Compounding Method C. This nanocomposite masterbatch ("Example 9") was then used to prepare Zytel® 101/sepiolite nanocomposites containing 3 wt % (Example 10) and 1 wt % (Example 11) sepiolite. Test specimens of the three nanocomposites and the Zytel® 101 based resin were molded as described above. Examples 10 and 11 demonstrate the improvement in the tensile modulus, tensile strength, flexural modulus, and heat deflection temperature in the nanocomposites relative to Comparative Example B.

TABLE 4

Properties of Zytel ® 101 Nanocomposites

|  | Comparative Example B | Example 9 | Example 10 | Example 11 |
|---|---|---|---|---|
| Zytel ® 101 (wt %) | 100 | 80 | 85 | 95 |
| Example 9 masterbatch (wt %) |  |  | 15 | 5 |
| Molecular Weight ($M_n$) | 17320 | 19160 | 18290 | 16810 |
| S-9 Sepiolite Content (wt %) | 0 | 20 | 3 | 1 |
| Properties Dry as Molded |  |  |  |  |
| Tensile Modulus (MPa) | 2991 | 9927 | 4263 | 3681 |
| Tensile Strength (MPa) | 77 | 121 | 92 | 84.7 |
| Elongation to Break (%) | 29 | 1.5 | 4.4 | 11.8 |
| Flexural Modulus (MPa) | 2958 | 8252 | 3721 | 3350 |
| HDT (66 psi/0.46 MPa) (° C.) | 230.8 | Not Determined | 240.1 | Not Determined |

Examples 12-15

Comparative Example C

Preparation and Properties of Toughened Aliphatic Polyamide Nanocomposites

The nanocomposite masterbatch prepared in Example 9 was used to prepare toughened Zytel® 101 nanocomposite resins containing 1, 2, 3, and 5 wt % S-9 sepiolite, using Compounding Method C. Compositions are presented in Table 5. Test specimens of the four nanocomposites and a control containing no sepiolite were molded as described above. Examples 12-15 highlight the significant improvement achieved relative to to the Comparative Example C in tensile and flexural modulus, tensile strength, and HDT with only modest additions of sepiolite.

TABLE 5

Properties of Toughened Zytel ® 101 Nanocomposites

|  | Comparative Example C | Example 12 | Example 13 | Example 14 | Example 15 |
|---|---|---|---|---|---|
| Zytel ® 101 (wt %) | 80.4 | 75.4 | 70.4 | 65.4 | 55.4 |
| Example 10 (20% S-9 Sepiolite Masterbatch) (wt %) | 0 | 5 | 10 | 15 | 25 |
| Engage ® 8180 (wt %) | 11 | 11 | 11 | 11 | 11 |

TABLE 5-continued

Properties of Toughened Zytel ® 101 Nanocomposites

|  | Comparative Example | Example | | | |
|---|---|---|---|---|---|
|  | C | 12 | 13 | 14 | 15 |
| TRX 301 (wt %) | 8.5 | 8.5 | 8.5 | 8.5 | 8.5 |
| Aluminum Stearate (wt %) | 0.1 | 0.1 | 0.1 | 0.1 | 0.1 |
| Sepiolite Content (wt %) | 0 | 1 | 2 | 3 | 5 |
| Properties Dry as Molded | | | | | |
| Flexural Modulus (MPa) | 1625.6 | 1799 | 1957 | 2119 | 2468 |
| Tensile Modulus (MPa) | 1702 | 1867.9 | 2044.6 | 2158 | 2550 |
| Tensile Strength (MPa) | 44.8 | 47.5 | 52 | 54 | 60 |
| Elongation to Break (%) | 40.8 | 30.7 | 23.6 | 22.6 | 19 |
| HDT (0.66 psi/0.46 MPa) (° C.)) | 197.1 | 200.5 | 213 | 211 | 221 |
| Notched Izod (ft-lb/in)(J/m) | 18.86 | 17.15 | 15.3 | 14.06 | 5.69 |
|  | (1007) | (915) | (817) | (751) | (304) |
| Properties at 50% Relative Humidity | | | | | |
| Flexural Modulus (MPa) | 822.6 | 961.4 | 1097.6 | 1220.9 | 1490.7 |
| Tensile Modulus (MPa) | 971 | 1069.2 | 1234.3 | 1407.2 | 1641.6 |
| Tensile Strength (MPa) | 42.4 | 40 | 40.3 | 39.5 | 42.11 |
| Elongation to Break (%) | 199.3 | 163.4 | 129.7 | 97.1 | 71.9 |

Stress-strain curves obtained during the standard tensile measurements showed that, in addition to the improved stiffness and strength provided by the addition of sepiolite to a toughened polyamide matrix, the resilience of the Example 14 nanocomposite was also improved by 45% relative to the control (Comparative Example C) (FIG. 3).

Examples 16-20

Comparative Example D

Comparison of Rheological Grade Sepiolite Pangel S-9 with Other Mineral Additives Attapulgite 420-P is a high quality attapulgite processed to provide viscosity suspension properties to a variety of applications including both aqueous and solvent based systems. Attapulgite 601-P is described as the finest grade of attapulgite gelling clay available. It is specially sized is and processed for thickening industrial products such as, paints, plastic coatings, flexographic inks, and adhesives. Pangel® HV is a rheological additive for aqueous systems, made from very pure sepiolite. Pansil® is a refined version of sepiolite designed for absorption applications, such as kitty litter. Pangel® S-9 and Pangel® HV are both rheological grade sepiolite; Pansil® is not.

Samples were prepared using Compounding Method A, with the exception that the micron-sized mineral additives were added with the resin at the rear of the extruder. All the samples were prepared using 97% Polyamide A and 3 wt % of the specified mineral additive. The samples were molded at a mold temperature of 115° C. with a melt temperature of 310° C.

Heat distortion temperatures are presented in Table 6. Example 17 contained the ground and micronized grade of sepiolite and exhibited a dramatically increased HDT relative to the other examples. In addition, all of the examples exhibited a significant improvement in HDT relative to Comparative Example D.

TABLE 6

HDT of Polyamide A Containing Various Minerals (3 wt %)

| Example | Comparative Example | Mineral Additive (wt %) | HDT (66 psi, 0.46 MPa), (° C.) |
|---|---|---|---|
| 16 |  | Pansil ® | 206.8 |
| 17 |  | Pangel ® S-9 | 217.0 |
| 18 |  | Attapulgite 420-P | 212.6 |
| 19 |  | Attapulgite 601-P | 161.1 |
| 20 |  | Pangel ® HV | 159.1 |
|  | D | Sodium Montmorillonite | 153.2 |

What is claimed is:

1. A nanocomposite composition, consisting essentially of:
a) at least one thermoplastic polyamide wherein the at least one polyamide is an aliphatic polyamide or a semiaromatic polyamide, wherein
  i) the aliphatic polyamide is selected from the group consisting of polytetramethylene adipamide, polyhexamethylene adipamide, polyhexamethylene azelaamide, polyhexamethylene sebacamide, polyhexamethylene dodecanoamide, bis(para-aminocyclohexyl) methane dodecanoamide, polycaprolactam, poly-11-amino-undecanoic acid, a copolymer of two of the above polymers or their components, and a terpolymer of three of the above polymers or their components, and
  ii) the semiaromatic polyamide is selected from the group consisting of: poly(m-xylylene adipamide) hexamethylene adipamide/hexamethylene terephthalamide copolyamide; hexamethylene terephthalamide/2-methylpentamethylene terephthalamide copolyamide; poly(dodecamethylene terephthalamide); poly(decamethylene terephthalamide); decamethylene terephthalamide/decamethylene dodecanoamide copolyamide; poly(nonamethylene terephthalamide); the polyamide of hexamethylene isophthalamide and hexamethylene adipamide; the polyamide of hexamethylene terephthalamide, hexamethylene isophthalamide, and hexamethylene adipamide; copolymers of the above semiaromatic polyamides; or combinations of any of these;
b) unmodified sepiolite nanoparticles, unmodified attapulgite nanoparticles, or a mixture of unmodified attapulgite nanoparticles and unmodified sepiolite nanoparticles, wherein the width and thickness of a particle are each less than 50 nm;

and optionally further comprising:

c) a polymeric toughening agent;
d) a reinforcing agent;

or e) a combination of (c) and (d).

2. The nanocomposite composition of claim 1 wherein the unmodified nanoparticles are present at about 0.1 to about 30 weight percent, based on the weight of polyamide plus unmodified nanoparticles.

3. The nanocomposite composition of claim 2 wherein the unmodified nanoparticles are present at about 0.1 to about 4 weight percent, based on the weight of polyamide plus unmodified nanoparticles.

4. The nanocomposite composition of claim 1 comprising a polymeric toughening agent which is present in an amount of from about 2 to about 30 wt % based on the total composition.

5. The nanocomposite composition of claim 4 wherein the polymeric toughening agent contains functional groups selected from carboxyl, anhydride, amine, epoxy, halogen, or mixtures of these.

6. The nanocomposite composition of claim 4 wherein the polymeric toughening agent is an ionomer of units derived from alpha-olefin having the formula $RCH=CH_2$ wherein R is H or alkyl having from 1 to 8 carbon atoms and from 0.2 to 25 mole percent of units derived from an alpha, beta-ethylenically unsaturated mono- or dicarboxylic acid, at least 10% of the acid groups of said units being neutralized by metal ions having a valence of from 1 to 3, inclusive.

7. The nanocomposite composition of claim 1 comprising about 0.1 to about 50 weight percent of a reinforcing agent, based on the total of all ingredients in the composition, exclusive of the unmodified sepiolite nanoparticles, selected from the group consisting of: (i) kaolin clay, talc, wollastonite, mica, and calcium carbonate; (ii) glass in various forms such as fibers, milled glass, solid spheres, and hollow spheres; (iii) carbon as black or fiber; (iv) titanium dioxide; (v) aramid in the form of short fibers, fibrils or fibrids; or (vi) mixtures of two or more of these.

8. The nanocomposite composition of claim 1 comprising:
a) about 0.1 to 4 wt % unmodified sepiolite nanoparticles;
b) at least one polyamide selected from the group consisting of: polyamide 6,6; polyamide 6; hexamethylene terephthalamide/2-methylpentamethylene terephthalamide copolyamide; and hexamethylene adipamide/hexamethylene terephthalamide copolyamide; and
c) 0 to about 20 wt % polymeric toughening agent comprising at least one of:
  i) an ethylene/propylene/hexadiene copolymer grafted with maleic anhydride; or
  ii) a copolymer of ethylene and acrylic or methacrylic acid that is at least 10% neutralized by metal ions.

9. An article of manufacture comprising the nanocomposite composition of claim 1.

10. The article of claim 9 wherein the article is an automobile component.

11. The article of claim 10 wherein the automobile component is selected from the group consisting of: a radiator end tank, air intake manifold, air induction resonator, front end module, engine cooling water outlet, fuel rail, ignition coil, engine cover, switch, handle, seat belt component, air bag container, pedal, pedal box, seat system, wheel cover, sun roof surround, door handles, and fuel filler flaps.

12. The article of claim 10 wherein the article is selected from the group consisting of: a connector, coil former, motor armature insulator, light housing, plug, switch, switchgear, housing, relay, circuit breaker component, terminal strip, printed circuit board, and housing for electronic equipment.

13. The article of claim 9 wherein the article is selected from the group consisting of: a power tool housing, sports equipment article, lighter, kitchen utensil, phone jack, small appliance, large appliance, furniture, eyeglass frame, packaging film, gear, pulley, bearing, bearing cage, valve, stadium seat, sliding rail for a conveyer, castor, HVAC boiler manifold, diverting valve, and pump housing.

14. The article of claim 13 wherein the sports equipment article is selected from the group consisting of: a ski boot, ski binding, ice skate, roller skate, and tennis racket.

* * * * *